United States Patent [19]
Brehm et al.

[11] Patent Number: 5,636,828
[45] Date of Patent: Jun. 10, 1997

[54] ELECTROMAGNETIC VALVE

[75] Inventors: Werner Brehm, Hemmingen; Walter Fleischer, Stuttgart, both of Germany

[73] Assignee: Robert Bosch GmbH, Stuttgart, Germany

[21] Appl. No.: 523,476

[22] Filed: Sep. 5, 1995

[30] Foreign Application Priority Data

Sep. 3, 1994 [DE] Germany .................. 44 31 459.0

[51] Int. Cl.$^6$ .................................................. F16K 31/06
[52] U.S. Cl. ........................... 251/129.14; 251/129.15
[58] Field of Search ........................ 251/129.14, 129.15, 251/129.01, 129.16

[56] References Cited

U.S. PATENT DOCUMENTS

| | | | |
|---|---|---|---|
| 4,756,331 | 7/1988 | Stegmaier | 251/129.14 X |
| 5,076,323 | 12/1991 | Schudt | 251/129.14 X |
| 5,088,520 | 2/1992 | Haynes et al. | 251/129.16 X |
| 5,414,398 | 5/1995 | Schumacher | 251/129.15 X |

*Primary Examiner*—Kevin Lee
*Attorney, Agent, or Firm*—Michael J. Striker

[57] ABSTRACT

A magnet core (14) which is penetrated by a tappet (35) guided in a bearing (38) is arranged in the interior (12) of an electromagnetic valve (10). A connection element (45) comprising plastic and having an integrally arranged valve seat (46) is injection molded onto the underside of the magnet core (14). As a result of the design and arrangement of the connection element (45) and bearing (38), the producibility of the electromagnetic valve (10) is simplified and its functional properties are improved.

9 Claims, 3 Drawing Sheets

ELECTROMAGNETIC VALVE

PRIOR ART

The invention is based on an electromagnetic valve according to the preamble of claim 1. Electromagnetic valves of this type, which are used, for example, in automatic transmissions of motor vehicles, have a magnet core which is surrounded by a solenoid and to which is connected a connection element designed as a turned part. A valve seat as well as channels and connections for the pressure medium are formed in the connection element. An armature is arranged on that side of the magnet core which is opposite the valve seat, which armature is connected to a tappet which penetrates the magnet core and acts on the valve seat. The tappet is guided in a bearing arranged in the magnet core. Furthermore, the tappet is press-fitted to a stop in a hole in the armature. Since the distance between the operating air gap and the valve seat as well as the distance between the armature underside facing the valve seat and the valve seat are critical for a precise characteristic of the electromagnetic valve, both the length of the tappet and the length of the connection element must be produced by machining in a very accurate and hence costly manner. Furthermore, the bearing guiding the tappet is arranged relatively near to the operating air gap, and this promotes the deposition of ferromagnetic dirt particles in the operating air gap. The accuracy of the characteristic of the electromagnetic valve during the service life thereof is impaired thereby.

ADVANTAGES OF THE INVENTION

In contrast, the electromagnetic valve according to the invention, having the characterizing features of claim 1, has the advantage that the distance, which is critical as a functional dimension, between the operating air gap and the valve seat can be produced in a cost-effective manner and with a high degree of accuracy.

Further advantages and advantageous developments of the electromagnetic valve according to the invention emerge from the subclaims and the description. As a result of the special design and arrangement of the tappet in the armature, it is also possible to set the distance between the armature underside and the valve seat in a simple and exact manner.

Advantageous seat and pressure medium channel geometries can be achieved in a simple manner due to the design of the connection element and of the valve seat from plastic.

It is particularly advantageous that the distance between the operating air gap and the bearing guiding the tappet is relatively large, with the result that the deposition of ferromagnetic dirt particles in the operating air gap is reduced and, consequently, the long-term accuracy of the characteristic is increased.

Particularly simple basic setting of the electromagnetic valve is made possible by a cover which rests on the armature and can be depressed.

BRIEF DESCRIPTION OF THE DRAWINGS

An exemplary embodiment of the invention is illustrated in the drawing and is explained in more detail in the following description.

DESCRIPTION OF THE EXEMPLARY EMBODIMENT

Figure 1:
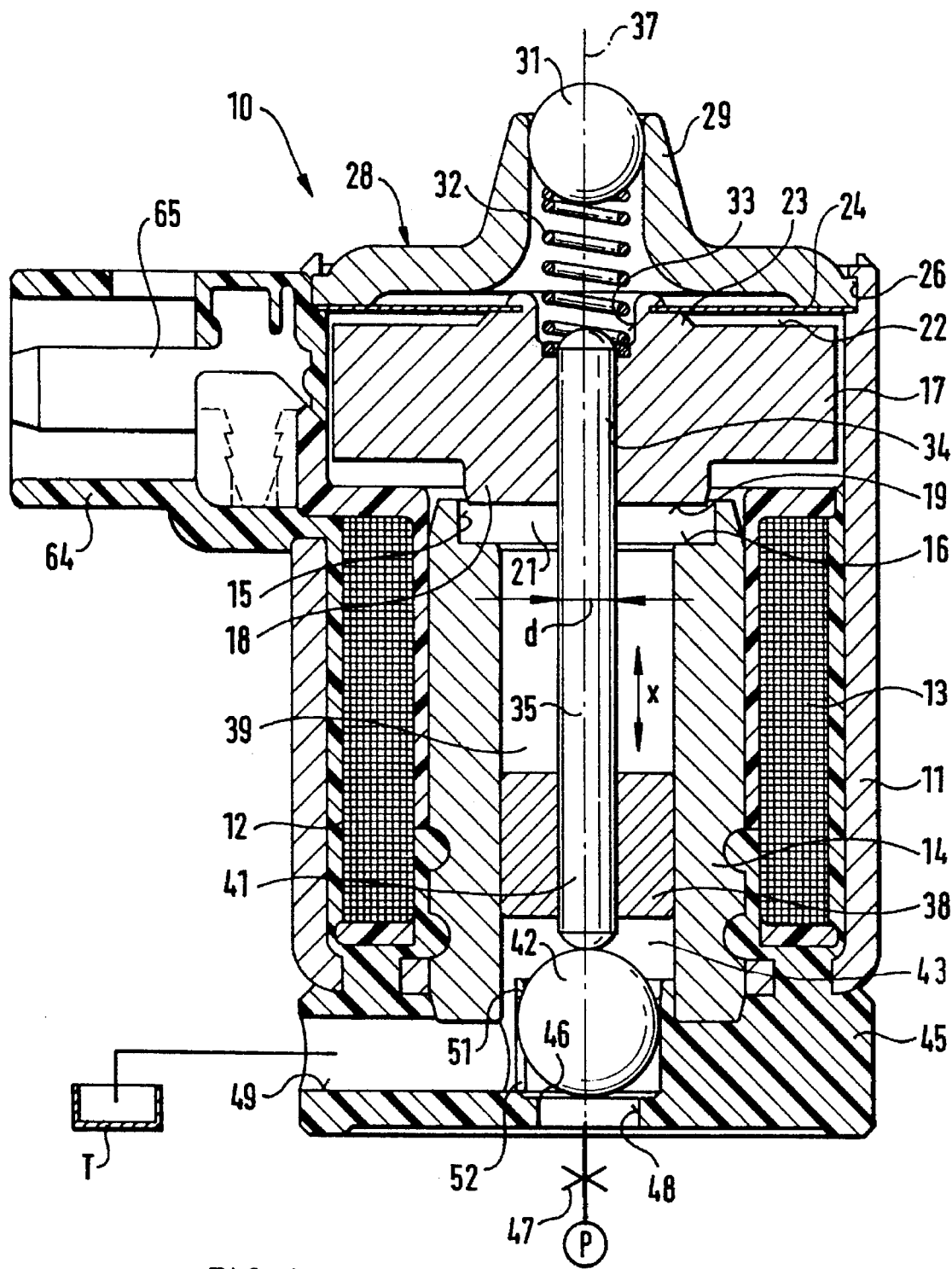
FIG. 1 shows a longitudinal section of an electromagnetic valve.

An electromagnetic valve 10, which is used, for example; as a pressure limiting or overpressure valve in automatic transmissions of motor vehicles, has a magnet housing 11 which is essentially in the form of a sleeve. A solenoid 13 is arranged in the interior 12 of the magnet housing 11. The solenoid 13 surrounds a magnet core 14 which is likewise essentially in the form of a sleeve. The magnet core 14 has a cylindrical depression 15, the bottom 16 of which is used as a stop surface for an armature 17. The armature 17 has a cylindrical extension 18 which projects into the depression 15 of the magnet core 14. An operating air gap 21 for the magnetic circuit is formed between the underside 19 of the extension 18 or of the armature 17.

An annular raised part 23 is formed at the top side 22, opposite to the extension 18, of the armature 17. The raised part 23 is connected to a diaphragm spring 24, which is arranged parallel to and at a distance from the top side 22 of the armature 17. The diaphragm spring 24 is fitted into an annular groove 26 which is formed in the magnet housing 11 and into which also engages a valve cover 28 which closes off the magnet housing 11 in a sealing manner and is designed as a deep-drawn part.

The valve cover 28 has an extension 29 which is in the form of a sleeve and in which a setting ball 31 is morticed. The setting ball 31 acts on a helical spring 32 which rests in a depression 33 formed in the armature 17. The setting ball 31 and helical spring 32 are used for the basic adjustment of the armature 17, in order to compensate for manufacturing tolerances of the magnetic circuit.

Formed in the armature 17 is a bore 34 in which a tappet 35 is press-fitted. The tappet 35, helical spring 32 and setting ball 31 are all arranged on a common axis of symmetry 37 of the armature 17. The tappet 35 is a simple fitting pin, such as is used as a standard machine element. The tappet 35, which, as will be explained in even more detail below, has a diameter "d" which is as small as possible, is guided in a sliding bearing 38 arranged in the magnet core 14. The sliding bearing 38 is located in the lower half of the magnet core 14, that is to say at a distance which is as large as possible from the operating air gap 21. The distance between the operating air gap 21 and the sliding bearing 38 can advantageously be selected to be so large that the guidance of the lower region 41 of the tappet 35 is still just ensured.

An armature space 39 is formed between the operating air gap 21 and the sliding bearing 38. The tappet 35 acts on a valve ball 42, which is arranged in a valve space 43 formed underneath the sliding bearing 38 and which interacts with a valve seat 46 formed in a connection element 45. A pressure medium channel 48, which is formed in the connection element 45 and is connected, with the interposition of a diaphragm 47, to a pump P, proceeds from the valve seat 46, in alignment with the axis of symmetry 37. A return channel 49, which opens into the valve space 43, is formed in the connection element 45 at right angles to and above the pressure medium channel 48 or the valve seat 46. In the exemplary embodiment, the return channel 49 and the pressure medium channel 48 have a cylindrical design, but other channel shapes, such as, for example, frustoconical return 49 and pressure medium 48 channels, may also be advantageous, depending on the application.

The valve ball 42 is guided in a ball cage 51 which is integrally formed in the connection element 45. Said cage has openings 52 for the pressure medium at least in the direction of the return channel 49.

Figure 2:
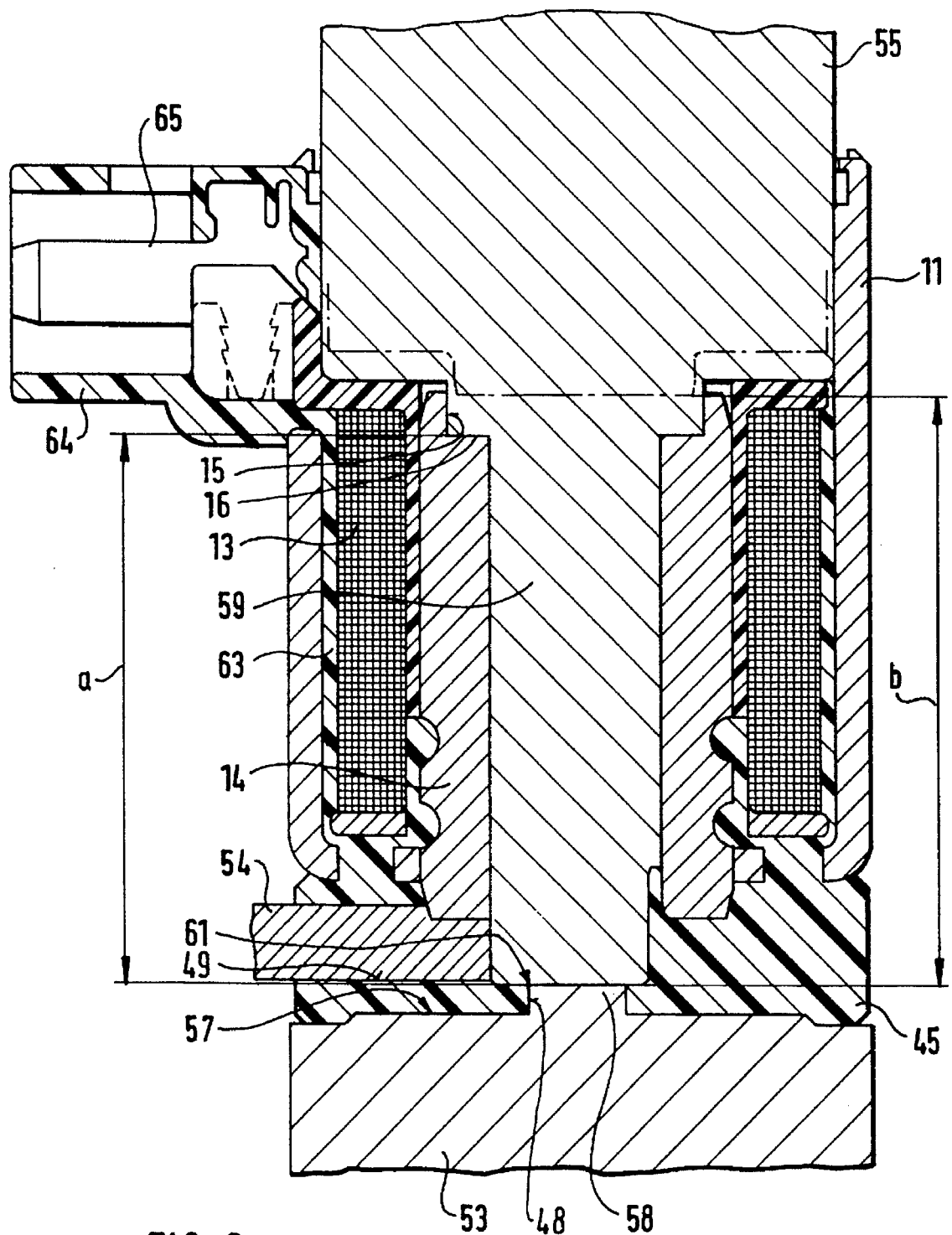
FIG. 2 shows a schematic sketch for illustrating the production of the electromagnetic valve.

The connection element 45 which comprises plastic can he produced in the following way, as illustrated in a simplified manner in FIG. 2:

The magnet housing 11, the solenoid 13 and the magnet core 14 are inserted into an appropriately shaped injection mold (not illustrated). Three mold punches 53, 54, 55 then move into the injection mold. The mold punch 53 serves as a termination for the base 57 of the electromagnetic valve 10 and has an extension 58 corresponding to the desired shape of the pressure medium channel 48. The mold punch 54 forms the return channel 49. The multiply-stepped mold punch 55 completely fills the interior 12 of the magnet housing 11 in the region of the armature 17 and of the depression 15 of the magnet core 14, and projects with an essentially cylindrical extension 59 into the interior of the magnet core 14. The mold punches 53 and 55 touch one another at the level of the valve seat 46, the latter being formed by the transition 61 between the two punches 53 and 55. Plastic is now injected into the punch mold prepared in this way, said plastic at the same time molding the connection element 45 in the desired way. At the same time, the interspace 63 between the outer side of the solenoid 13 and the inner side of the magnet housing 11 is completely filled by the plastic and a connection plug 64 is molded on, in which are arranged connecting lugs 65 for the solenoid 13.

It emerges from the above-described production method that the distance "a" between the bottom 16 of the depression 15 and the valve seat 46 or the transition 61, which distance is responsible for the functioning of the electromagnetic valve 10 or the accuracy of the characteristic, is dependent only on the dimensional accuracy of the extension 59 of the mold punch 55. That is to say, in particular, that, irrespective of the length accuracy of the magnet core 14, the same distance "a" is always formed by the connection element 45 comprising plastic.

After the connection element 45 has been produced or injection molded on, the remaining parts of the electromagnetic valve 10 can be mounted or inserted. In this case, it is essential that the distance "b", illustrated in FIG. 2, between the underside 19 of the indicated armature 17 and the valve seat 46 or the transition 61, which distance is likewise essential for the functioning or accuracy of the characteristic of the electromagnetic valve 10, can be set by press-fitting the tappet 35 to an appropriate depth into the armature 17. In this case, the press-fitting depths differ minimally from one tappet 35 to the other, since both the tappet 35 and the valve ball 42 are inexpensive mass-production parts of high accuracy.

The electromagnetic valve 10 which is used as an overpressure or pressure limiting valve functions as follows: As soon as a system pressure set by the electromagnetic valve 10 is exceeded in the pressure medium channel 48, the valve ball 42 lifts off the valve seat 46 and clears the path for the pressure medium to the tank T via the return channel 49, as a result of which the system pressure is limited in the desired way. The system pressure is set by corresponding driving or energizing of the solenoid 13. In this case, the driving is such that as the energization increases, the armature 17 with the tappet 35 and the valve ball 42 is pressed to an ever greater extent against the valve seat 46, that is to say the spring force of the helical spring 32 is intensified in the direction of the valve seat 46.

The accuracy of the characteristic of an electromagnetic valve 10 of this type during its service life essentially depends on how many ferromagnetic particles which are inundated by the pressure medium are deposited in the operating air gap 21 as the site of highest magnetic field strength. This deposition depends, on the one hand, on the quantity of pressure medium exchanged with the environment during every stroke of the tappet 35 and, on the other hand, on the distance of the sliding bearing 38 from the operating air gap 21. The pressure medium exchange volume is reduced in the electromagnetic valve 10 by selecting the diameter d of the tappet 35 to be as small as possible for a given stroke, that is to say by minimizing the pressure medium volume which is exchanged per stroke—stroke·d/4·π. On the other hand, the arrangement of the sliding bearing 38 in that half of the magnet core 14 which faces the valve ball 42 creates an armature space 39 which is as large as possible, and hence a large distance between the sliding bearing 38 and the operating air gap 21. Consequently, ferromagnetic particles which are inundated through the sliding bearing 38 into the armature space 39 are preferably deposited on the sliding bearing 38.

To supplement the above description, attention is drawn to the fact that the deposition of ferromagnetic particles on the valve ball 42 can be reduced, for example, by copper-coating or zinc-coating said ball, or by using a high-grade steel or glass ball.

Figure 3:
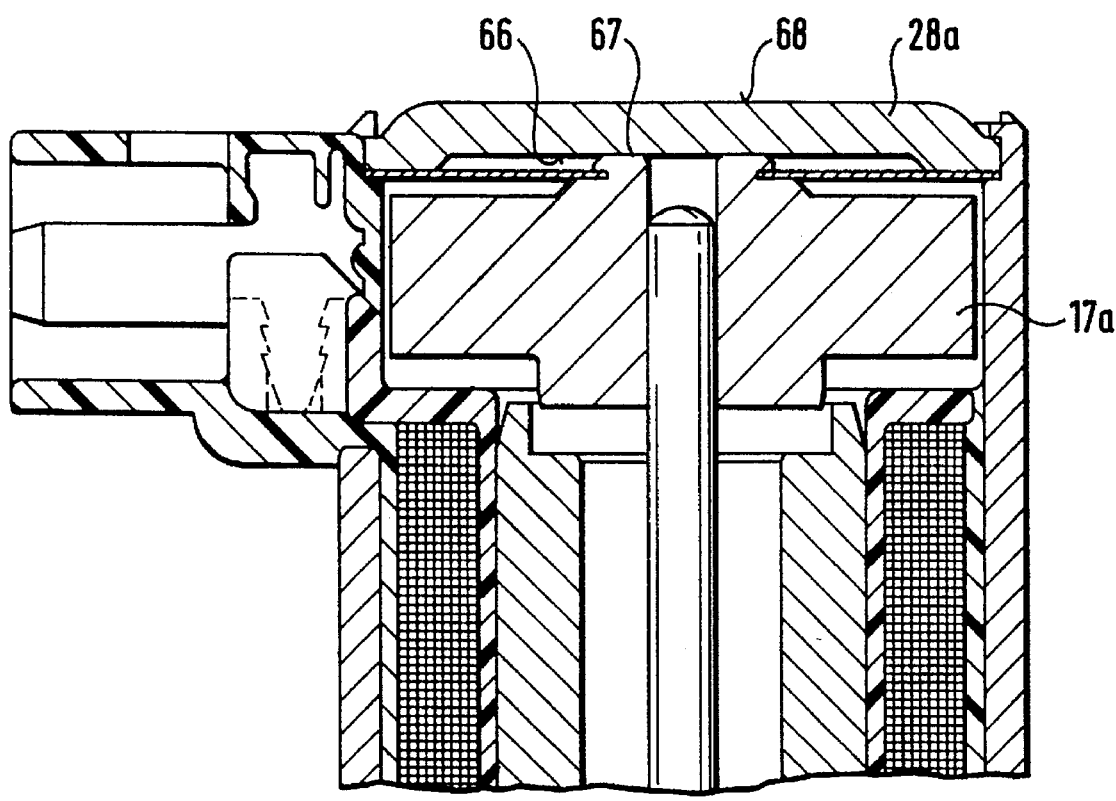
FIG. 3 shows a longitudinal section of part of a modified electromagnetic valve according to FIG. 1.

It emerges from the construction or production of the electromagnetic valve 10 that the functional dimensions a and b which are critical for the characteristic can be produced and set very accurately and with little outlay. Therefore, the additional capability of setting the prestress of the helical spring 32 by means of the setting ball 31 is unnecessary for many applications. Of course, a correspondingly designed setting screw may also be arranged instead of the setting ball 31. If a comprehensive setting capability is unnecessary, it is sufficient, as illustrated in FIG. 3, to construct a non-magentic valve cover 28a in such a way that its underside 66 rests flat in an annular region 67 of the armature 17a. Even in this case, however, a certain compensation is possible in that the top side 68 of the valve cover 28a can be depressed or pressed in, as a result of which the armature 17a is displaced with the tappet 35 in the direction of the valve seat 46.

Attention is additionally drawn to the fact that, instead of the valve ball 42 which is used as a valve element, use may also be made of a second tappet which is correspondingly actuated by the tappet 35. It is also conceivable to use a correspondingly designed one-part tappet instead of the tappet 35 and the valve ball 42.

We claim:

1. An electromagnetic valve, comprising a magnet housing; a valve element formed as a tappet; an armature firmly connected to said tappet; a magnet core arranged in an interior of said housing; a solenoid surrounding said magnet core and interacting with said armature; a connection element provided with at least one bore for a pressure medium, said connection element being also provided with a valve seat which is integrally formed in said connection element and with which said tappet cooperates, said connection element being directly mounted on said magnet core as an injection molded part composed of plastic so as to form a structural unit with a specific distance between said valve seat and an end of said magnet core which is opposite to said armature which specific distance is defined by a total length of said magnet core and said connection element and is produced by the corresponding injection molding length of said connection element.

2. An electromagnetic valve as defined in claim 1; and further comprising a guiding cage formed in said connection element, and a valve member guided in said guiding cage so that said tappet acts on said valve member.

3. An electromagnetic valve as defined in claim 2; wherein said valve member is formed as a valve ball.

4. An electromagnetic valve as defined in claim 1, wherein said magnet core has a region which faces said valve seat; and further comprising a bearing arranged in said region of said magnet core and guiding said tappet in a sliding manner.

5. An electromagnetic valve as defined in claim 1, wherein said armature has a side which is opposite to Said tappet; and further comprising a cover connected to said magnet housing and arranged on said side of said armature, said cover resting at least partially on said side of said armature.

6. A method for producing an electromagnetic valve, comprising the steps of forming a magnet housing; arranging in the interior of said magnet housing a magnetic core; arranging in said magnet housing a solenoid which surrounds said magnetic core and interacts with an armature; permanently connecting the armature to a valve element formed as a tappet; and directly molding a connection element which has at least one bore for pressure medium and which is provided with a valve seat for said tappet, on said magnet core as an injection-molded part composed of plastic so as to form a structural unit with a specific distance between said valve seat and an end of said magnet core which is opposite to said armature which specific distance is defined by a total length of said magnet core and said connection element and is produced by the corresponding injection molding length of said connection element.

7. A method as defined in claim 6, wherein said step of directly molding include introducing into a mold two mold punches which form the valve seat so that a first one of said mold punches completely penetrates the magnet core and extends as far as a level for the valve seat while a second one of the mold punches rests with an extension on an end of the first mold punch, and a transition region forming the valve seat is created between the mold punches.

8. A method as defined in claim 7; and further comprising the step of introducing into the mold a third mold punch which forms a pressure medium channel in the connection element.

9. A method of producing an electromagnetic valve having a magnet housing which accomodates a magnetic core and a solenoid surrounding the magnetic core and interacting with an armature, the method comprising the steps of permanently connecting the armature to a valve element formed as a tappet; and directly molding a connection element which has at least one bore for pressure medium and which is provided with a valve seat for the tappet, on the magnet core as an injection-molding part composed of plastic so as to form a structural unit with a specific distance between the valve seat and an end of the magnet core which is opposite to the armature, which specific distance is defined by a total length of the magnetic core and the connection element and is produced by the corresponding injection molding length of the connection element.

* * * * *